(12) United States Patent
Frick

(10) Patent No.: US 7,829,191 B2
(45) Date of Patent: Nov. 9, 2010

(54) LENS FOR LIGHTING SYSTEM

(75) Inventor: Markus W. Frick, Reno, NV (US)

(73) Assignee: Night Operations Systems, Reno, NV (US)

( * ) Notice: Subject to any disclaimer, the term of this patent is extended or adjusted under 35 U.S.C. 154(b) by 302 days.

(21) Appl. No.: 12/005,238

(22) Filed: Dec. 26, 2007

(65) Prior Publication Data

US 2009/0168433 A1 Jul. 2, 2009

(51) Int. Cl.
*B32B 17/06* (2006.01)

(52) U.S. Cl. .................. 428/428; 428/432; 428/697; 428/698

(58) Field of Classification Search .............. 428/428, 428/432, 697, 698, 701, 702, 704
See application file for complete search history.

(56) References Cited

U.S. PATENT DOCUMENTS

| | | | |
|---|---|---|---|
| 4,947,291 A | 8/1990 | McDermott | |
| 5,072,347 A | 12/1991 | Brunson | |
| 5,142,458 A | 8/1992 | Brunson | |
| 5,144,207 A | 9/1992 | Brunson | |
| 5,228,770 A | 7/1993 | Brunson | |
| 5,359,779 A | 11/1994 | Polk et al. | |
| 5,630,661 A | 5/1997 | Fox | |
| 5,666,017 A * | 9/1997 | McGuire | 313/110 |
| 6,335,086 B1 * | 1/2002 | Veerasamy | 428/217 |
| 6,567,248 B1 | 5/2003 | Schmidt et al. | |
| 6,720,081 B2 * | 4/2004 | Vitt et al. | 428/432 |
| 6,761,467 B2 | 7/2004 | Matthews et al. | |
| 6,984,061 B1 | 1/2006 | Soderberg et al. | |

* cited by examiner

*Primary Examiner*—Gwendolyn Blackwell
(74) *Attorney, Agent, or Firm*—SilverSky Group LLC

(57) ABSTRACT

A lighting system that produces a high intensity beam of light in the visible and infrared spectral regions that can be used for non-covert and ultra-covert operations. The lighting system is comprised of a HID lamp, a reflector, a lens, and a filter. The lamp utilizes a short arc gap and a unique combination of xenon gas, mercury and metal halides that produce a highly collimated beam of light in the visible and near-infrared regions. The lens is coated on both sides with an antireflective coating that reflects ultraviolet light and enhances the transmission of visible and infrared light. The lens is also coated on its outer surface with a hydroscopic material that protects the glass lens and the second antireflective coating from abrasion while facilitating the dispersion of water on the outer surface.

6 Claims, 9 Drawing Sheets

LENS FOR LIGHTING SYSTEM

BRIEF DESCRIPTION OF THE INVENTION

The present invention is directed to lighting systems and illumination devices, and more particularly to a lens for a lighting system that produces a high intensity beam of light in the visible and infrared spectral regions that can be used for non-covert and ultra-covert operations.

CROSS-REFERENCES TO RELATED APPLICATIONS

Not Applicable.

STATEMENT AS TO THE RIGHTS TO INVENTIONS MADE UNDER FEDERALLY SPONSORED RESEARCH OR DEVELOPMENT

Not Applicable.

REFERENCE TO A "SEQUENCE LISTING," A TABLE, OR A COMPUTER PROGRAM LISTING APPENDIX SUBMITTED ON A COMPACT DISK

Not Applicable.

BACKGROUND OF THE INVENTION

High intensity discharge (HID) lamps include mercury vapor, metal halide, high and low pressure sodium, and xenon short-arc lamps. HID lamps produce light by generating an electric arc across two spaced-apart electrodes housed inside a sealed quartz or alumina arc tube filed with gas or a mixture of gas and metals. The arc tube is typically filled under pressure with pure xenon, a mixture of xenon-mercury, sodium-neon-argon, sodium-mercury-neon-argon, or some other mixture such as argon, mercury and one or more metal halide salts. A metal halide salt (or metal halide) is a compound of a metal and a halide, such as bromine, chlorine, or iodine. Some of the metals that have been used in metal halide lamps or bulbs include indium, scandium and sodium. Xenon, argon and neon gases are used because they are easily ionized, produce some level of immediate light, and facilitate the striking of the arc across the two electrodes when voltage is first applied to the lamp. The heat generated by the arc then vaporizes the sodium, mercury and/or metal halides, which produce light as the temperature and pressure inside the arc tube increases.

A pure xenon short-arc lamp produces a very white light (a correlated color temperature of about 6420 K) with about 10% of the total emitted light in the near infrared (850 to 900 nm). Xenon-mercury lamps produce a more bluish-white light. All xenon short-arc lamps generate significant amounts of ultraviolet radiation. Mercury vapor-based lamps produce a bluish light, but can be color corrected by coating the inside of a glass bulb placed around the arc tube with phosphor, which converts some portion of the ultraviolet light generated by the light into red light. Mercury vapor-based lamps produce significant ultraviolet (UV) radiation, even when protective measures are taken to block some of the UV radiation. Sodium-based lights generally produce an orange/yellow to pink/orange light, but with higher pressures within the arc tube can produce a whiter light (having a color temperature of around 2700 K). By altering the mixture of metal halides in a metal halide lamp, it is possible to generate light with varying levels of intensity and correlated color temperatures as low as 3000 K (very yellow) to as high as 20000 K (very blue). The color temperature of the sun is measured at 5770 Kelvin (K), with daylight ranging from about 5000 to 6500 K.

Since HID lamps are negative resistance devices, they require an electrical ballast to provide a positive resistance or reactance that regulates the arc current flow and delivers the proper voltage to the arc. Some HID lamps, called "probe start" lamps, include a third electrode within the arc tube that initiates the arc when the lamp is first lit. A "pulse start" lamp uses a starting circuit referred to as an igniter, in place of the third electrode, that generates a high-voltage pulse to the electrodes to start the arc. Initially, the amount of current required to heat and excite the gases is high. Once the chemistry is at its "steady-state" operating condition, much less power is required, making HID lamps more efficient (producing more light with less energy over a long period of time) than filament based lights.

The majority of light generated by a short gap HID lamp is produced by a small line source of plasma. This relatively small light source enables the output of the HID lamp to be more easily focused into an intense, narrow beam than many other light sources. A concave (parabolic or elliptical) shaped reflector, with a hole in the bottom through which the HID lamp is inserted, is used to focus the light. Most reflectors are formed from polished aluminum, which is sometimes coated with other reflective materials. To the naked eye, the surface of the reflector looks very smooth and highly reflective, but upon closer inspection, the surface of most reflectors is covered with irregularly shaped jagged ridges and valleys, left by the forming process, that inefficiently reflect light. An uneven surface can result in light of different wavelengths being refracted on the surface of the reflector, instead of being properly focused into a defined beam, or distribution pattern. This refracted light will reduce the efficiency of the system by creating more "stray" light rays (with less of the light generated by the HID lamp making it into the desired light beam or light distribution pattern). Accordingly, a better prepared and processed reflector can achieve greater efficiency as an electro-optical system.

A smaller arc gap spacing between the lamp's electrodes will produce a smaller arc and a smaller line source, which can, in turn, be even more narrowly focused into an intense beam of light by an appropriate reflector. This makes HID lamps ideal for lighting applications that require a beam of light that can travel great lengths to clearly illuminate distant objects, such as search lights, targeting lights, flash lights and other security, rescue, police and military applications. HID lamps could also be useful in police and military applications where an extremely intense light is used to temporarily blind and disorient a person. When used as a non-lethal weapon, it is very important that the HID lamp produce little UV radiation, or that most of the UV radiation generated by the lamp be filtered out, so the retinas of the person subjected to the beam of light generated by the HID lamp will not be damaged.

While it is important to limit UV radiation produced by an HID lamp, it can also be important to limit visible light and to generate, and not excessively limit, the infrared light produced. Infrared light is often used in covert military operations to enhance the effectiveness of night vision goggles. Since it is not always possible or preferable to equip a vehicle, craft or person with different lighting sources for visible and infrared light, such as during covert military operations where the weight carried by an individual needs to be kept to a minimum, it is sometimes necessary to apply a filter to a single HID lamp light (a HID light) so as to block visible light while continuing to pass near infrared and infrared light. If the HID light is to be used in covert situations, it is critically important that the filter block as much visible light as possible in order to prevent the user of the HID light from being detected.

Filtering visible light from the intense beam of light generated by an HID lamp is much more difficult than filtering more diffuse light sources. For example, a red absorption glass filter rated to block all light below 750 nm (the upper limit of the visible light spectrum), might still allow some amount of visible light from a HID lamp through the filter. Even stronger filters, on the other hand, might block all light, including the infrared light, or cut back so far on the infrared light as to reduce the usefulness of the light source. For example, in covert military operations, a high intensity infrared illuminator may be necessary to improve the effectiveness of night vision goggles. This is especially true for Generation III night vision goggles used by the U.S. military and Allied Forces that utilize image intensification ($I^2$) technology to intensify ambient light.

The peak performance, or radiant sensitivity, of the gallium-arsenide photocathode utilized in Generation III systems is within the 450 to 950 nm region of the spectrum. Unfortunately, many allegedly covert infrared illuminators utilize intense filters that either block the majority of light transmission in the 700 to 1000 nm range, or block all light transmission below 875 nm and a large percentage of light transmission up to 900 nm, thereby limiting the illuminator to either the narrow band between 900 to 950 nm, or generating little to no useable illumination at all. Accordingly, a covert operation filter is needed that will work with a highly efficient HID light and reflector assembly to block all visible light transmission below 800 nm, block some large portion of light in the 800 to 860 nm wavelength range, and reflections of other light from the outer surface of the filter, while maximizing the transmission of infrared light in the range most useable for illumination by Generation III night vision systems.

DETAILED DESCRIPTION OF THE INVENTION

Figure 1:
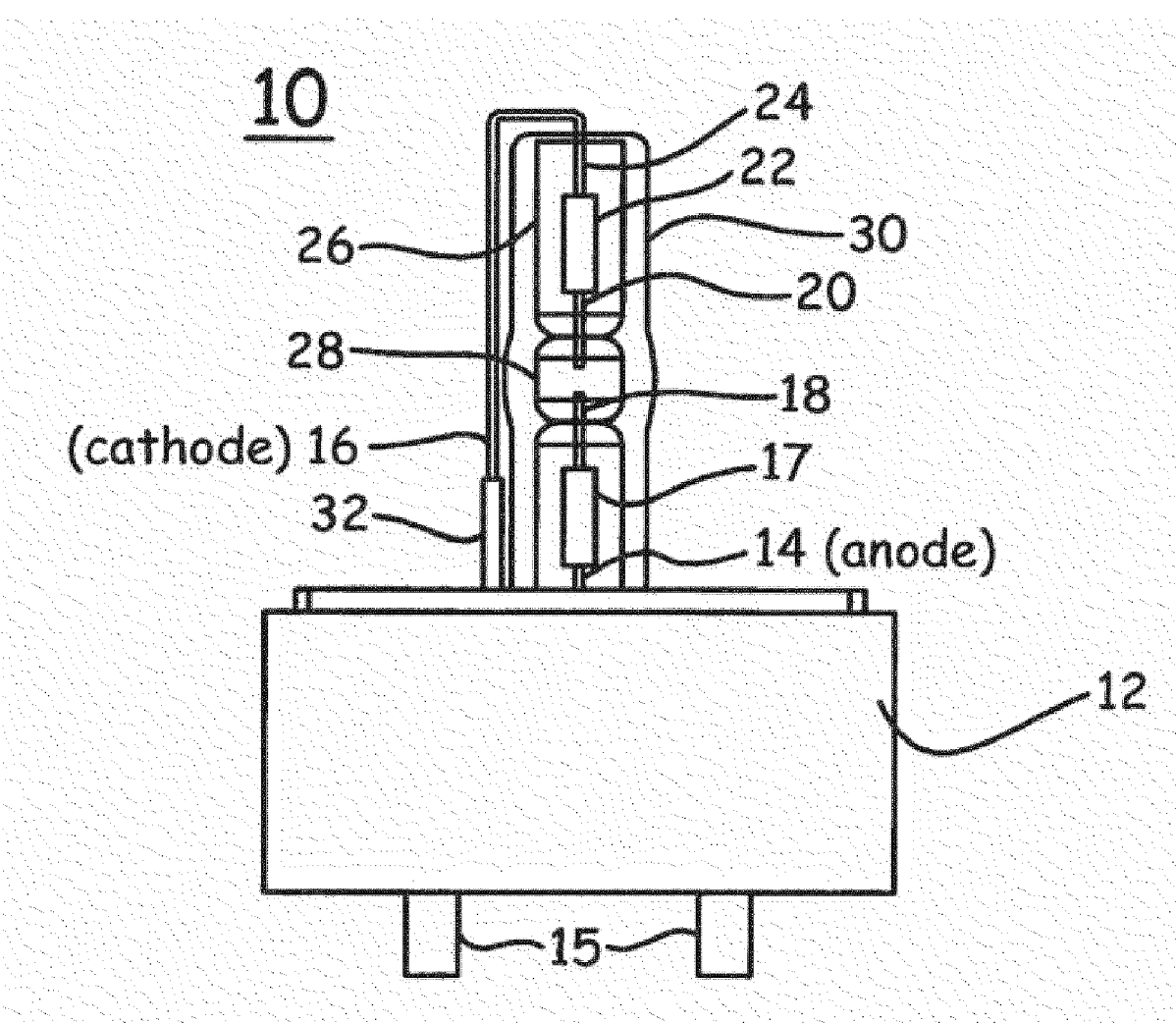
FIG. 1 is a side elevation view of a HID lamp in accordance with the present invention.

The present invention is directed to a lighting system with a novel high intensity discharge lamp, reflector, lens, and filter that operate together to produce a high intensity beam of light in the visible and infrared spectral regions that can be used for non-covert and ultra-covert operations. A HID lamp 10 in accordance with the preferred embodiment of the present invention is illustrated in FIG. 1.

Lamp 10 is an arc-metal halide alternating current device that combines the robustness of an automotive-grade xenon-metal halide lamp with the smaller arc gap and lower wattage (versions include 10, 12, 15, 18, 21, 28, 45, 50, 55, 60 and 75 watts) of an arc-metal halide lamp. The preferred embodiment of this ultra compact high efficacy lamp is ideal for tight-beam search lights. The short arc gap produces a small intense line source of light, and when married with a precisely manufactured reflector can achieve a tightly collimated beam (with a 0.5 to 14 degree beam angle). The short overall length of the lamp is robust enough to meet the shock requirements of handheld and vehicle mounted search and rescue, military surveillance and reconnaissance, and law enforcement applications.

A base 12 is formed from an electrically insulating material, such as a thermoset, or engineered rigid plastic resin with a high arc resistance, through which the electrical lead-through 14 (anode) and frame wire 16 (cathode) are separately routed and held stably in place. Within the base 12 (not shown), the lead-through 14 and frame wire 16 are connected to the much larger pin connectors 15. The lead-through 14 is formed of a strong, heat resistant material, such as nickel or tungsten, at the base 12, and is connected to one end of a molybdenum foil structure 17, which is connected on its other end to an electrode 18. The electrode 18 is typically formed of tungsten because of its extremely high melting point. Another tungsten electrode 20, molybdenum foil structure 22 and lead-through 24 complete the interior of the quartz glass burner structure 26. The burner structure 26 is sealed at both ends, with a separate sealed discharge chamber in its middle bell-shaped arc discharge chamber 28. The gap between the electrodes is preferably between 0.5 and 2.0 mm.

The molybdenum foil structures 17 and 22 are utilized to preserve the average lifespan of the burner structure 26. As the tungsten electrodes thermally expand during use, the molybdenum foil structures contract to absorb the expanding electrodes and prevent any of the seals from breaking. Molybdenum foil structures 17 and 22 are only useful when it is desired to expand the lifespan of the lamp 10. Since the lumen output of the lamp 10 begins to decrease after 300 to 500 hours of use, a longer lifespan for the lamp 10 may not always be important. In such cases it may be desirable to remove the molybdenum foil structures 17 and 22 and lead-throughs 14 and 24, leaving just the electrodes 18 and 20. Removing these components has the added advantage of shortening the overall length of the burner structure 26, which further reduces its bending moment (thereby improving its structural integrity and resistance to shock, such as when the lighting system is dropped from greater heights) and moves the bell-shaped region closer to the base of the reflector, thereby enabling the reflector housing to be even smaller.

The burner structure 26 is further enclosed in a quartz oxide glass shroud 30 that provides thermal stability for the lamp 10 and further improves the structural rigidity of the lamp 10. Thermal stability is important because even a two to three degree variance in the temperature of the burner structure 26 can cause the lamp 10 to flicker, which is undesirable.

To further improve the structural stability of the lamp 10, the burner structure 26 is formed from thicker walls of quartz oxide glass than is used in other HID lamps. In the preferred embodiment of the invention, the walls of the burner structure 26 range from 1 to 1.2 mm thick, whereas typical glass walls are in the 0.5 to 0.8 mm range. Ultralow beta-OH quartz is used for both the burner structure 26 and the shroud 30 because this type of glass generates fewer oxides over time than other types of glass materials. This is important because when oxide glass is heated (in lamp 10 at temperatures of up to 900° C.) it will plate out oxides that are electrically attracted to the statically charged surface of the reflector. These microscopic oxide particles migrate away from the lamp 10 and build up on the surface of the reflector, creating a hazy coating over time that impairs the performance of the reflector.

As most reflector assemblies are sealed to prevent users from touching the surface of the reflector (and either scratching the surface or coating the surface with skin oils), the hazy oxide coating cannot be removed. Oxide migration can be further reduced, once the burner structure has been built and sealed, by baking the burner structure in an oven for one hour at 1200 degrees centigrade. This causes many of the oxides in the quartz oxide glass to burn out, thereby reducing future oxide production.

The arc discharge chamber 28 is filled with xenon gas and other light-generating materials and pressurized to between 2 to 100 atmospheres, as is the case of ultra-high pressure lamps "UHPs" and hybrids thereof. Xenon gas is used because it is easily ionized and facilitates the striking of an arc across the electrodes 18 and 20 when voltage is first applied to the lamp 10. Other fast ionizing noble gases could be used in place of xenon. The xenon gas, once ionized, will produce some immediate level of light and increase the temperature and pressure inside the bell-shaped region 28 until the other light-generating materials are vaporized and begin to generate their own light. The light-generating materials added to the xenon gas include a small amount of mercury, between 0.05 to 0.2 mg/mm$^3$, and a combination of halides. Although dosing with mercury will add an ultraviolet component to the light generated by the lamp 10, the ultraviolet light generated is low because of the small amount of mercury that is used and because of the particular combination of halides used in the chamber 28 shifts the spectral characteristics of the light generated by the lamp into the infrared range. Ultraviolet emissions are also reduced by the presence of the shroud 30 and anti-reflective coatings on the lens, as will be further discussed below.

The particular combination of light-generating materials used inside the arc discharge chamber 28 were selected for a number of additional reasons, including: to generate a significant amount of visible light in the 400 to 800 nm range with a color temperature between 5600 to 6000° K. (the visible light component); to generate little ultraviolet radiation; and to generate a significant amount of infrared light in the 860 to 890 nm range (the infrared component). To achieve these light-generating objectives, a combination of different halides are used in the chamber 28, including cesium iodide (CsI), dysprosium iodide (DyI$_3$), indium iodide (InI), thulium iodide (TmI$_3$), holmium iodide (HoI$_3$), sodium iodide (NaI), thallium iodide (TiI), neodymium iodide (NdI$_3$) and/or calcium iodide (CaI$_2$). These halides are used in varying percentage ratios with dosage amounts ranging from 0.0003 to 0.08 mg/mm$^3$.

Two of the halides included in the infrared light component, cesium iodide and sodium iodide, would never be used in a HID lamp designed to generate visible light because both halides produce red to infrared light and dampen the fluoresce intensity of other light-generating chemicals in the discharge chamber 28. The presence of either halide can result in a 10 to 15%, or greater, drop in lumen output. In the present invention, however, these two halides are desirable because they generate a large amount of near infrared light in the 860 to 890 nm range, which is important to the covert operations aspects of the lamp 10.

To counter the damping effect of cesium iodide or sodium iodide, the chamber 28 can also be dosed with one or more of the other halides listed above (the fluoresce intensifier component), such as scandium iodide and/or thallium iodide (like those mentioned above), which have the ability to intensify the fluoresce output of the other chemicals in the chamber 28 without compromising the effect of the cesium or sodium halides. Likewise, neodymium and/or dysprosium halides tend to further enhance the visible light generating aspects of the lamp 10.

A number of different combinations and dosage amounts of the listed halides can achieve the light-generating objectives of the present invention. In fact, it might be desirable to use different combinations dosed in different amounts to achieve slightly different light-generating objectives than those noted above, such as a slightly different shift in light output at different wavelengths or different color temperatures. For example, since thallium produces a green light, only a small amount can be used in order to maintain a color temperature between 5600 to 6000° K, but if a different color temperature is desired, such as between 5000 to 7000° K, it might be appropriate to increase the amount of thallium utilized. When doping the lamp with any of these halides, however, care should be taken not to use any of the halides in excess because too much of one halide can counter-effect the beneficial qualities of other halides or prevent desired light-generating objectives from being achieved.

The frame wire 16 serves the function of the cathode to which electrons flow from the anode. In the preferred embodiment of the present invention, the frame wire is kept as thin as possible in order to reduce the shadow it casts within the lamp. In automotive applications, where light is not wanted at the top of the light and at least partially on the sides, a thick frame wire can be used and positioned in one of the light blocked area. In the lamp 10, which generates and uses all 360° of light produced, the frame wire 16 is as made thin as possible. It is preferable to use nickel for the frame wire 16 since nickel is still strong and resilient, even when very thin, and exhibits good heat resistance.

It should also be noted in FIG. 1 that the insulator 32, positioned where the frame wire 16 enters the base 2, would typically extend, in prior art applications, all the way up from the base 12 to where the frame wire passes by the arc discharge chamber 28. This was done, in the prior art, in an effort to prevent arcing between the electrode 18 and the frame wire 16, which was believed, if it were to occur, to diminish the efficiency and longevity of the lamp 10, and would also cause reliability issues during the "striking" (starting) of the lamp 10. In the preferred embodiment of the present invention, however, it has been found that such arcing does not occur even when the frame wire 16 is not insulated near the chamber 28 and is, in fact, positioned to rest almost right against the shroud 30 in the area of the chamber 28. Rather than having a negative effect, the presence of the un-insulated frame wire 16 near the chamber 28 appears to operate like an antenna that generates a significant RF field near the chamber 28, thereby improving the start time of the lamp 10 by speeding up the excitation of "free electrons," which aid thermal inertia in the chamber 28 causing the mercury and halides inside the chamber 28 to vaporize faster.

The combination of the above elements in the lamp 10 results in a robust, ultra compact, high efficiency HID lamp (rated between 10 and 75 watts) that produces an arc brightness between 1 and $3 \times 10^6$ nits (up to 85 lumen/watt), visible light with a color temperature between 5000 and 7000° K, with 5600 to 6000° K being preferred, with peak infrared light generation in the 860 to 890 nm range, which is able to instantly reach approximately 40% of the stable operating radiant energy and instantly restart with a proper ballast/ignitor (or "inductor").

Figure 2:
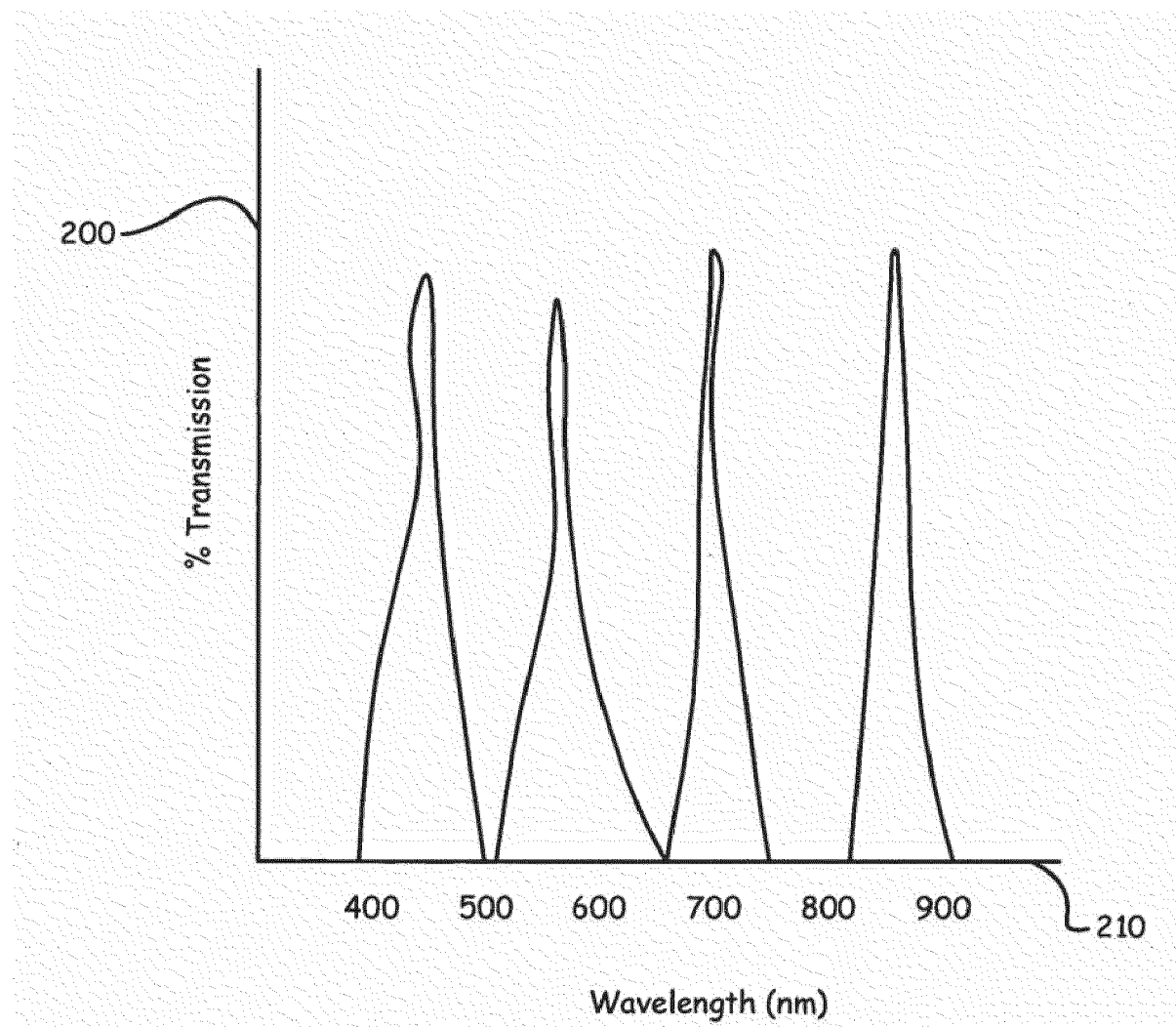
FIG. 2 is a graph illustrating the percentage of light transmitted by the HID lamp of FIG. 1 from between less than 400 to over 900 nm.

The light output of the lamp 10 can be better understood with reference to FIG. 2, which illustrates spectral power distribution of the lamp 10, demonstrating both the high output in the visible wavelengths (mostly in the 400-750 nm range, with peak light generation between 400 to 675 nm) and very definite spikes in the near infrared spectrum (specifically between 860-890 nm), where it proves to be the most beneficial, as a complement and enhancement, to the recent developments in image intensification and night vision technologies. In particular, the first grouping of light spikes is in the visible light spectrum, with little light transmitted in the ultraviolet range below 380 nm and distinct spikes of light transmitted between approximately 425 and 675 nm. There are two large spikes of almost 90% transmission between 500 and 550 nm. At the same time, less than 10% transmission occurs in a large portion of the red light range (680 to 750 nm) and in the initial portion of the infrared light range (750 to 800 un). The second grouping of spikes is in the infrared range of 810 to 910 nm, with two spikes of 90% or more transmission at 860 nm and 890 nm.

Figure 3:
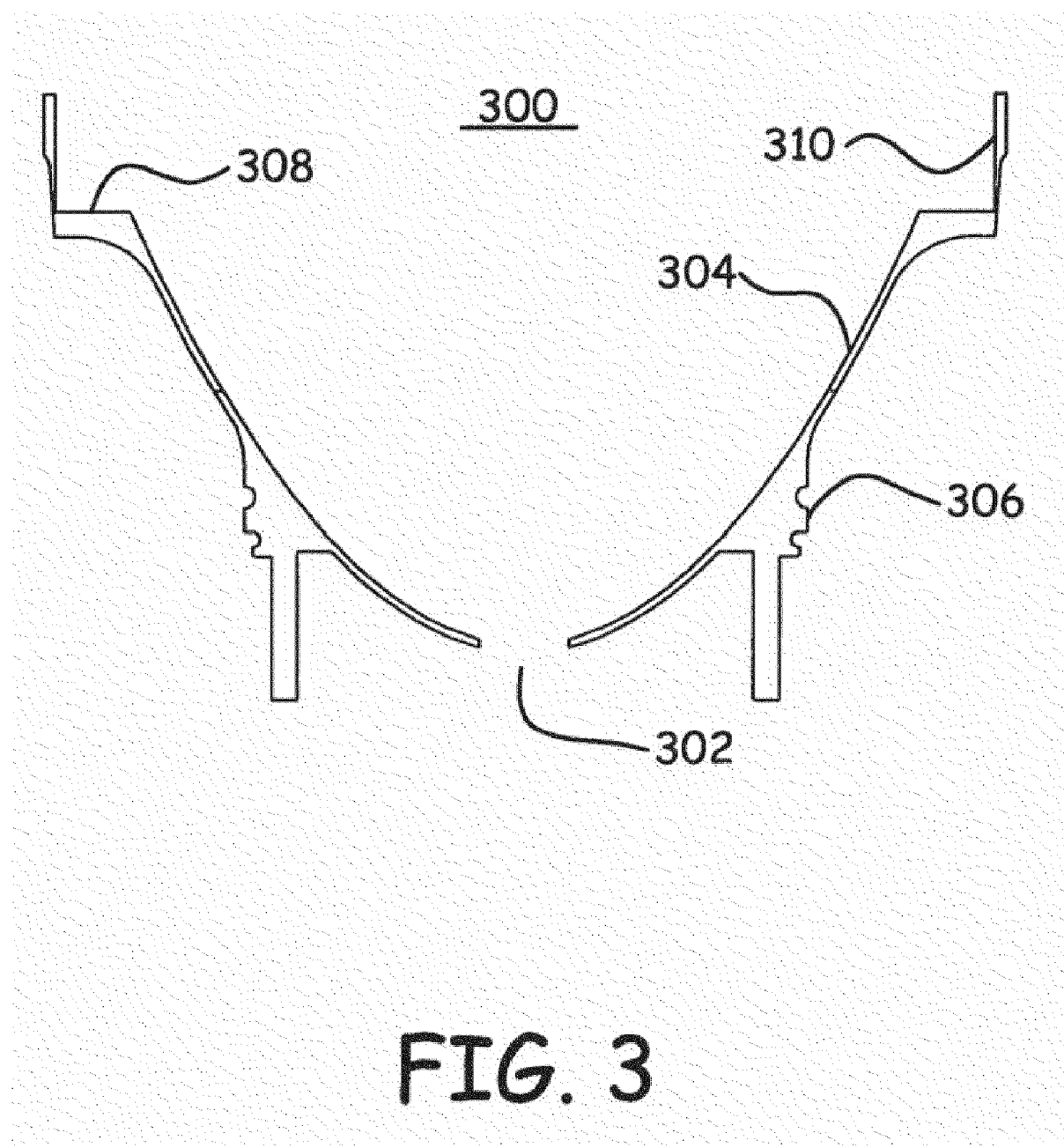
FIG. 3 is a cross-sectional, side elevation view of a reflector housing in accordance with the present invention.
Figure 4:
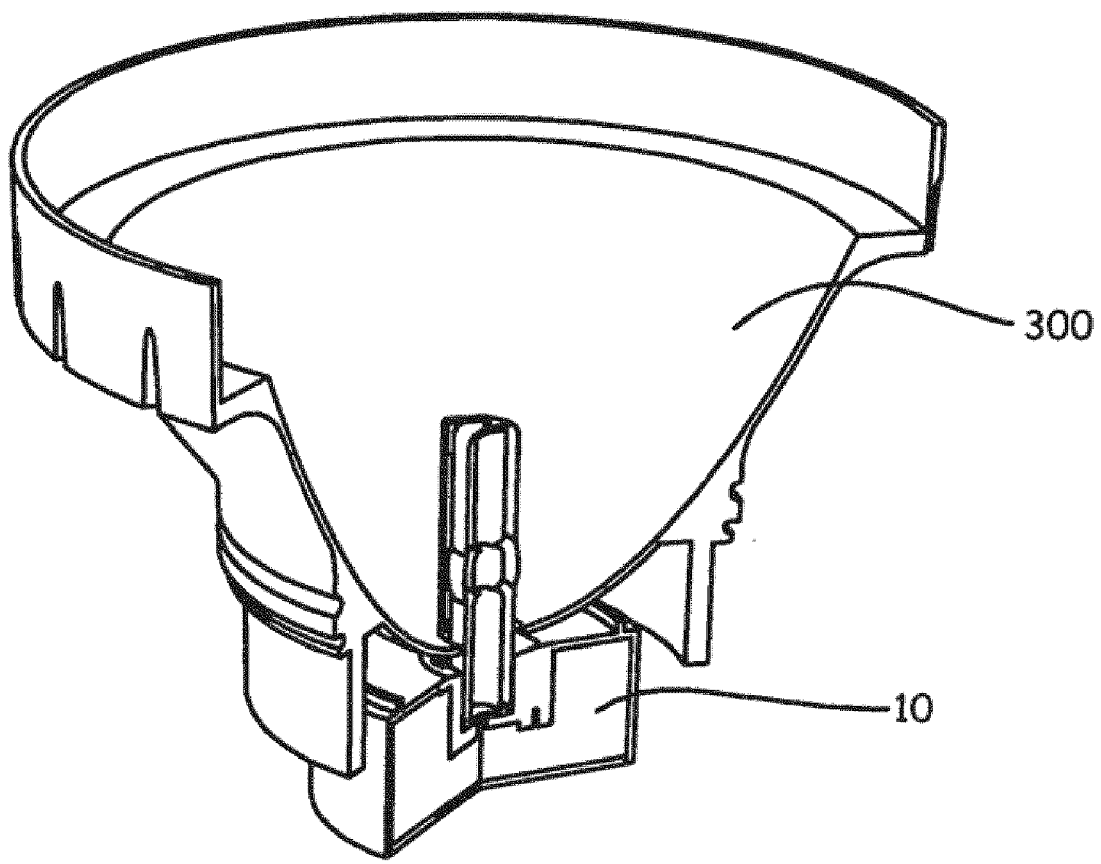
FIG. 4 is a partially broken, perspective view of a reflector housing and HID lamp assembly in accordance with the present invention.

In order to realize some of the significant benefits generated by the lamp 10, an appropriate reflector is required to direct light away from the lamp 10 in a highly collimated beam. A reflector housing 300 in accordance with a preferred embodiment of the present invention is illustrated with reference to FIGS. 3, 4 and 6. FIG. 3 illustrates a cross-sectional, side elevation view of the concave (parabolic or elliptical) reflector housing 300, while FIG. 4 provides a partially broken, perspective view of the reflector housing 300 in relation to the lamp 10. As shown, the lamp 10 is inserted through an opening 302 formed in the bottom of the reflector housing 300. The opening 302 is small so the reflective internal surface 304 of the reflector can be as close to the lamp 10 as possible. Increasing the amount of reflective surface 304 at the base of the lamp 10 increases the efficiency of the light by directing more light generated by the lamp 10 into the beam of the light. Since this light also carries radiant heat, directing more of the light away from the light can improve heat management within the light.

Figure 7:
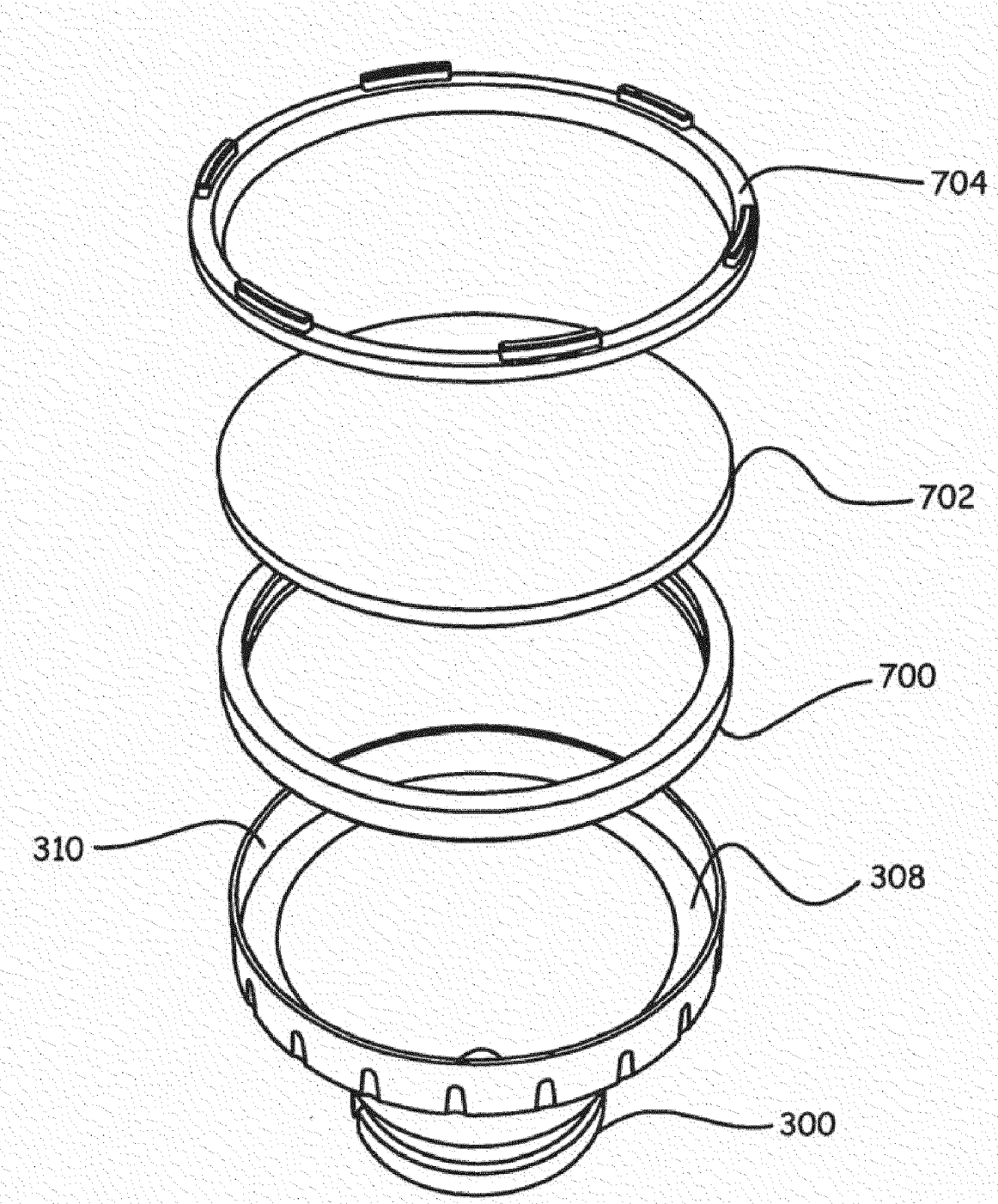
FIG. 7 is an exploded perspective view of the lens assembly and reflector housing in accordance with the present invention.

FIGS. 3 and 4 further illustrate a connector ring 306 of the reflector housing 300 that enables the reflector to be connected to the remainder of the lighting assembly (not shown), and a lens seat 308 and lens wall 310 that hold the lens assembly in place, as further illustrated in FIG. 7. The reflector housing 300 is preferably formed from a single piece of aluminum alloy, which is rigid and lightweight, and capable of being polished to form a highly reflective interior surface, while sharing the same metal substrate to form the exterior surface, which may then be hardened, plated or coated as desired. For example, it may be desirable to blacken the exterior surface of the reflector in some manner so that it will reflect no light. As a substrate serving both purposes, the exterior surface and the polished interior surface, pure aluminum is not strong enough to resist severe deformation that can occur if the light is dropped. An aircraft grade aluminum alloy, such as 6061, formed from magnesium and silicon, can be used, but 7075 aluminum alloy, with zinc as the alloying element, is preferred. 6061 aluminum alloy allows for a ferrous component of up to 0.7% that can interfere with different polishing techniques.

Figure 5:
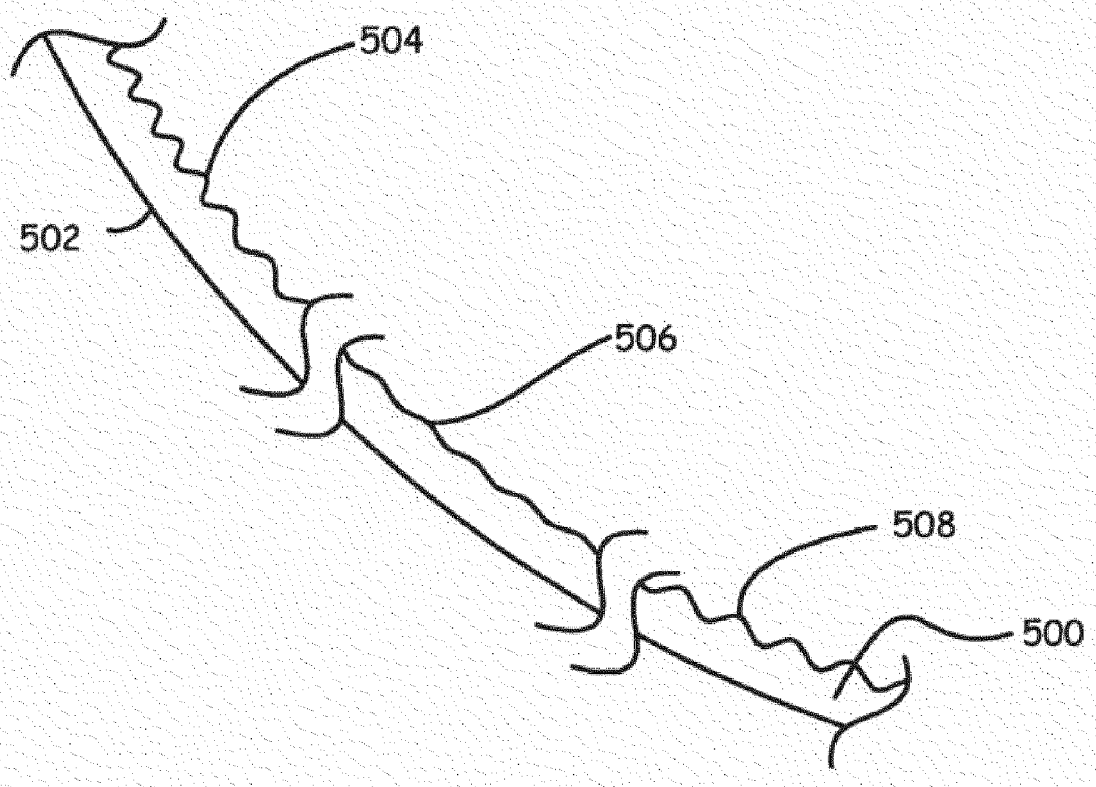
FIG. 5 is magnified illustration of a partially broken, cross-sectional, side elevation view of the surface of a prior art reflector, prior to being coated, after vacuum metalizing plating, and after electro-nickel plating.

One of the most important aspects of the reflector housing 300 is the smoothness of the reflector surface 304. Since aluminum alloys are relatively soft, they are fairly easy to machine or form in order to fashion a reflective surface, which is where most manufacturers of reflector housings stop, believing that a reflective surface finished in this manner is good enough for most lighting applications. This is incorrect for a number of reasons. First, aluminum oxidizes easily, and although aluminum oxide is mostly clear, it does reduce the reflectivity of the aluminum surface, so unless the finished surface is coated in some manner, it will quickly become duller. While a thin film of a clear protective coating will retard oxidation, so as to maintain a reflective coating, some manufacturers coat the aluminum reflector surface with an even more reflective metal. The problem with this approach is that it compounds one of the shortcomings of the typically processed reflector housing, which is illustrated in FIG. 5. FIG. 5 is a magnified illustration of a partially broken, cross-sectional, side elevation view of the surface of a prior art reflector 500, having an outer diameter 502 and an inner reflective surface 506.

As shown in FIG. 5, which magnifies the reflective surface area by approximately 100 times, after the surface has been produced using prior art techniques, but before it is plated, the surface 506 is not flat. The surface 506 includes a series of irregularly shaped ridges and valleys resulting from tool paths and machining marks caused, and left, by accepted forming or machining practices. Each of these ridges and valleys act to refract light off the surface of the reflector in a non-uniform and undesirable manner. This results in "stray" light rays that cannot be properly focused into a directed beam and leads to greater inefficiency of the electro-optical system. To improve the reflective properties, and brilliance, of this surface, a vacuum metal coating or sputter coating of 0.001 to 0.002 inches of a reflective metal might be applied, resulting in the surface 508, or an electrolytic nickel plating of 0.001 to 0.004 inches might be applied, resulting in the surface 504. In both cases, while the surfaces 504 and 508 may exhibit better cosmetic sheen and luster than that of surface 506, they still both include, and/or have exacerbated (electrolytic plating has a tendency to cause more build up on the ridges than in the valleys), the fairly significant ridges and valleys of the machined or formed surface finish that are present on the uncoated reflector surface substrate 506.

Furthermore, vacuum metal coating (vacuum metalizing), metal sputter coating, and electrolytic plating deposit very thick and inaccurate layers of source material onto a substrate through processes, in all cases, that are very difficult to control or effectively repeat. In most examples, the above mentioned deposition methods rarely achieve a uniform distribution of their coating, and or plating. The uneven nature of these depositions are further handicapped by their thickness which introduces even greater variances which for an optical system, like a reflector, requires high precision in regards to overall surface tolerances, uniformity, and smoothness. These deposition methods rarely improve upon the accuracy and consistency of the surfaces to which they are applied. Rather, it is more likely than not that these processes will only serve to heighten or highlight the imperfections, and or irregularities, of the substrate's surface finish to which they have been applied.

Figure 6:
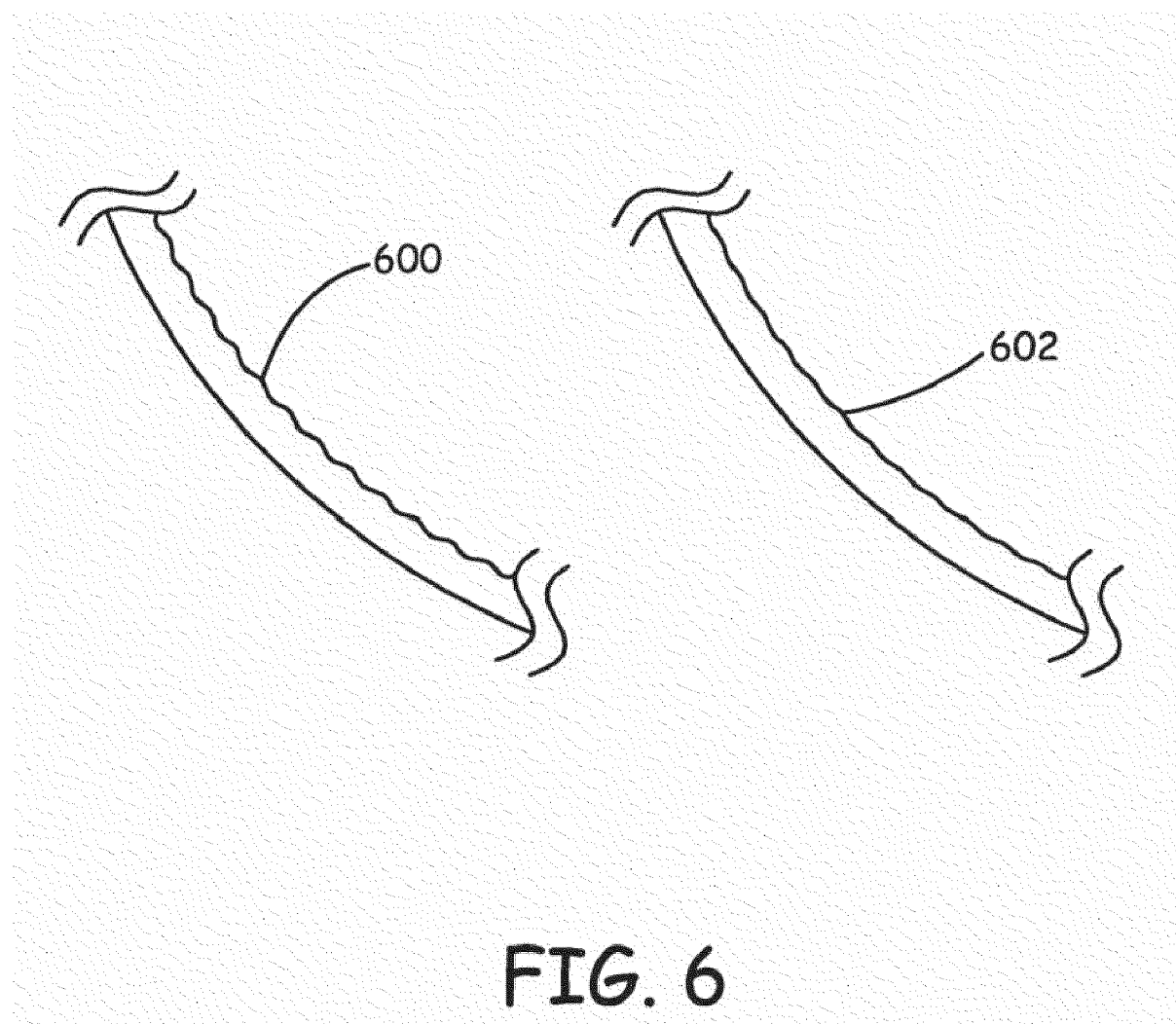
FIG. 6 is magnified illustration of a partially broken, cross-sectional, side elevation view of the surface of the reflector of FIGS. 3 and 4, prior to and after the surface has been coated.

As illustrated in FIG. 6, in the preferred embodiment of the present invention, the reflective surface 600 of the reflector housing 300 is finished using a cutting or cleaving technique that produces an approximately 45 Å finish, meaning the maximum distance from the lowest point of a valley to the highest point of a ridge is only 45 Å. The highest "tool making" optical grade surface finish (Optical #1) is a 256 Å finish, so a 45 Å finish is a significant improvement, especially over the prior art which is capable of achieving a repeatable and accurate Optical #2 finish at best. To further improve the reflectivity of the surface 600, the surface 600 is coated with a combination of silver, titanium and silica. Silver is used because it has a 99.8 to 99.9% reflectivity for visible light and is also a good reflector of infrared light. Aluminum does not reflect red and yellow light or infrared light nearly as well as silver, which is another reason for not using a polished and clear coated aluminum surface for a light used in such applications.

In the preferred embodiment of the present invention, the surface 600 is first coated with a number of very thin layers of material, using a thin film deposition method, such as an electron beam evaporator. This typically produces a coating ranging from 1 to 10 nm in about one second. The first layer is silica, which is used to increase the surface hardness below the silver coating. The next coating is titanium, which is a good backing surface for silver and which increases the reflectivity of the silver. Silver is then deposed in several layers and finish coated with silica. The resulting reflective surface 602 is a very low angstrom finish, perhaps 10 Å or lower, which is optimized to reflect both visible light and infrared light generated by the lamp 10, and is able to produce a tightly collimated beam of light with a 0.5 to 14 degree beam angle.

FIG. 7 is an exploded perspective view of the lens assembly and reflector housing 300 in accordance with the preferred embodiment of the present invention. As previously noted, the lens seat 308 and lens wall 310 of the reflector housing 300 are used to accept and hold the rubber ring 700, which forms a shock absorbing seat for the lens 702. Lens 702 is then held in place by the retainer ring 704. As illustrated, the reflector housing wall 310 would be formed with a threaded surface that would mate with a threaded surface of the retainer ring 704 to firmly lock the lens 702 in place against the rubber ring 700. It may also be desirable to have the retainer ring otherwise lock in place so it cannot be removed once it is correctly installed, so as to prevent users from removing the lens and causing damage to the interior of the reflector housing 300. Other arrangements would also be possible.

The glass of the lens 702 is made from borofloat glass, a highly chemically resistant borosilicate glass with low thermal expansion properties and excellent transmission capabilities (more than 90% transmission in the 400 to 2000 nm wavelengths), that is produced using the float manufacturing process. The lens 702 is also coated, on both sides, with an anti-reflective coating that serves two purposes. First, the coating reflects ultraviolet light, thereby preventing ultraviolet light in the light beam from exiting the light. Second, the coating further enhances the transmission capabilities of the lens, thereby increasing transmission from approximately 90 to 91% at certain wavelengths to approximately an additional 4.5% per coated side (by improving and or removing certain naturally occurring angles of incidence). Furthermore, the outside of the lens (facing the atmosphere) is coated with a hydrophobic thin film that protects the outer anti-reflective coatings against abrasion, while also preventing the collection of moisture or liquids on the outer lens face. When moisture does contact the lens, it will "bead up" and effectively disperse from the glass, thereby maintaining the longevity of the len's glass coating and making it easier to keep clean during operation. The hydrophobic coating is also effective at facilitating the dispersion of debris, i.e., dust and grime.

Figure 8:
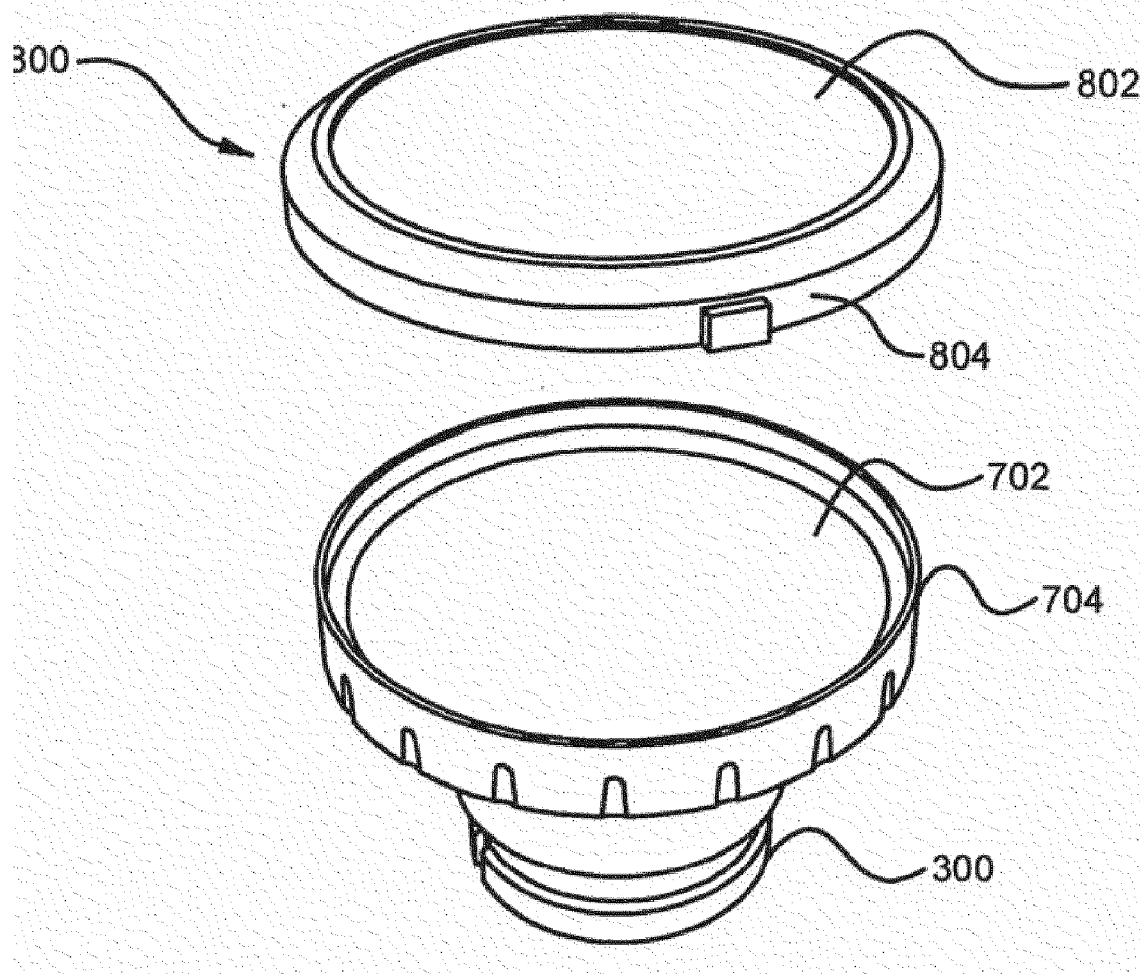
FIG. 8 is an exploded perspective view of the filter assembly and the lens and reflector housing assemblies of FIG. 7 in accordance with the present invention.

When the light is to be used in night vision or covert type operations, the lens assembly is covered with a removable band-pass filter assembly 800. FIG. 8 provides an exploded perspective view of the filter assembly 800 and the reflector housing 300 of FIG. 7, with the lens in place, in accordance with a preferred embodiment of the present invention. The filter is comprised of a filter lens 802 and a retainer ring 804. The retainer ring 804 preferably has either a bayonet type fitting or a camera lens protector type fitting that will lock into place and not be capable of accidently being dislodged, which would also be disastrous during covert use. The filter lens 802 is a combination of an absorption filter formed from a red glass substrate and a dichroic (thin film stacked) coating on the inside surface. The red glass substrate is preferably the K 1290 product manufactured by Kopp Glass, Inc. of Pittsburgh Pa., at a thickness of 4.5 to 5.5 mm, which is reported to block at least 98% of light transmission below 740 nm. Alternatively, the RG 780, RG 830, and RG 850 products manufactured by Schott AG of Mainz, Germany, could be used, which at a thicknesses of about 3.0 mm are reported to block at least 99% of typical light transmission below 800 nm.

With respect to each of these red glass substrate products, the transmission ratings are noted as "reported" because neither product is as effective as reported when utilized in combination with the HID lamp 10 and the highly efficient reflector housing 300. Hence, when utilized by themselves with the other components of the lighting system of the present invention, neither red glass substrate product is capable of blocking all of the visible light generated by the narrow, high intensity light beam. Rather, they are capable of absorbing about 80% or more of light below 800 nm. In true covert operational uses, any transmission of visible light could be disastrous, so use of the red glass substrates on their own is unacceptable. Hence, it is necessary to combine the red glass substrate with a dichroic coating as well.

The dichroic coating is applied to only the interior surface of the filter lens 802 because the coating is highly reflective and acts as a mirror to visible light and would reflect light directed at the filter lens 802, thereby possibly disclosing the location of the user in covert operations. Since the red glass substrate is so strongly tinted, it appears to be black to the eye, the uncoated exterior surface of the filter lens 802 reflects no visible light. Likewise, all other exterior surfaces of the lighting system are either painted black or anodized and dyed black so as to reduce light reflection from any exterior exposed surface of the lighting system, such as the outside of the reflector housing 300 and the retainer ring 804.

Figure 9:
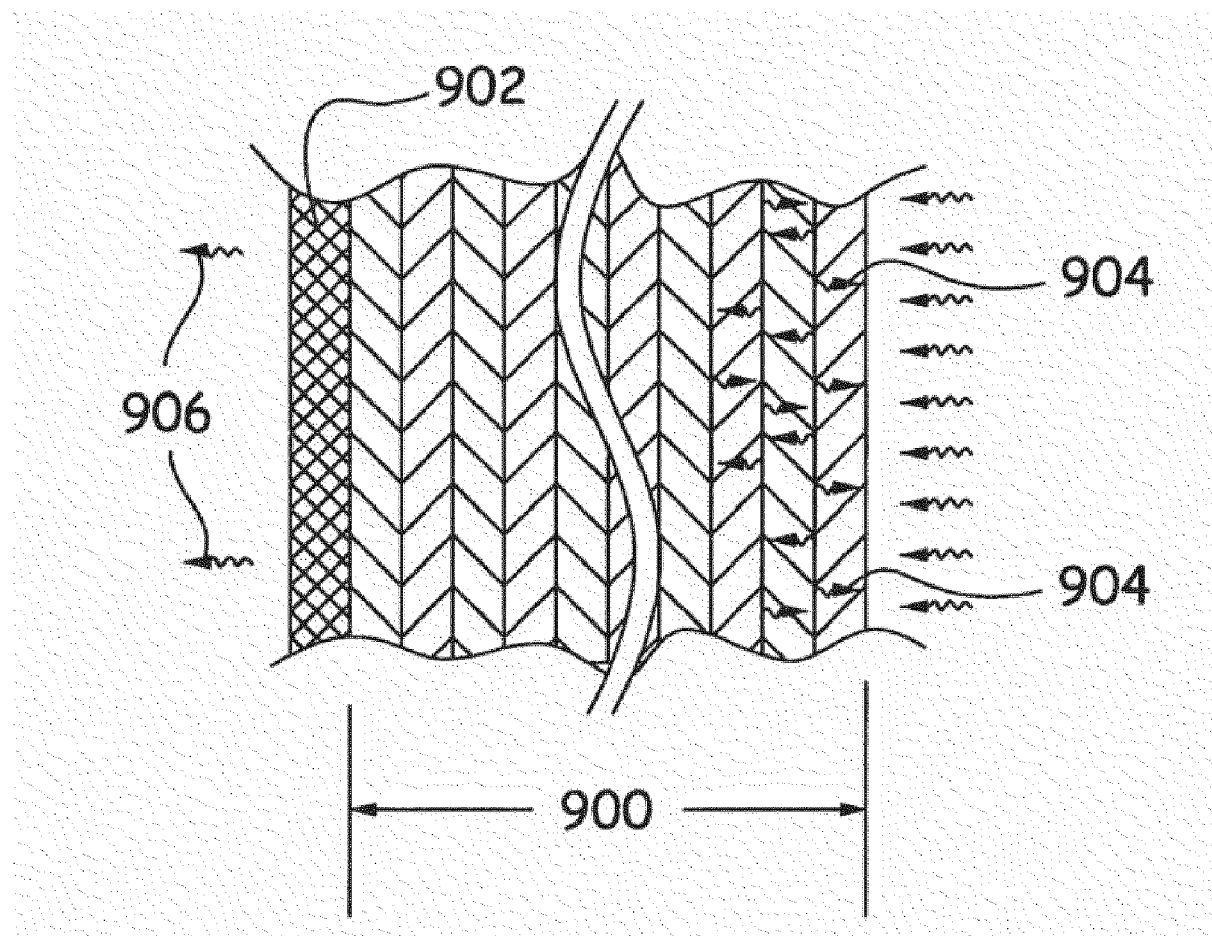
FIG. 9 illustrates the light filtering operation of the filter assembly of FIG. 8 in accordance with the present invention.

The dichroic coating is preferably formed from 15 layers of high RI (refractive index) and low RI "mirror" pairs, each formed by depositing successive quarter wave thicknesses of oxides of silicon and titanium on to the inside face of the filter lens 802. Although 15 layers of mirrored pairs are preferred, there can be as many as 90 mirrored pairs. Each layer pair creates an angle of incidence for visible light directed at the layer as illustrated in FIG. 9. Unwanted wavelengths (with respect to the present invention, those wavelengths of less than 850 nm) are transmitted and reflected as they pass through the mirror pairs. Transmitted wavelengths interfere with reflected wavelengths so as to cause destructive interference (cancellation) of approximately 80% of the unwanted wavelengths, while passing approximately 85% of the wanted wavelengths (those of 850 nm or higher).

The combination of the red glass substrate and the 15 layers of dichoric layer coatings 900 (shown partially broken and magnified out of proportion to the thickness of the glass substrate 902) has been found to be almost 100% effective at blocking visible light directed at the filter lens from the lamp 10 while allowing at least 85% of the desired near infrared light to pass. Neither the red glass nor the dichoric filter coatings are as effective by themselves. With the combination, unwanted wavelengths that are not cancelled by the dichoric layers are absorbed by the red glass, and unwanted wavelengths that cannot be absorbed by the red glass are blocked by the dichoric layers before reaching the red glass. As illustrated in FIG. 9, visible light 904 is ultimately either cancelled through destructive interference or absorbed, while near infrared and infrared light 906 is transmitted. Fifteen dichoric layers are preferred because fewer layers allow visible light to pass through, while additional layers begin to block infrared light transmission as well. Furthermore, since each layer of dichoric material applied creates an angle of incidence, the greater the number of dichoric layers, the greater the numbers of angles (of incidence) created. When there are too many layers, the "mirror stack" becomes less effective at reflecting and canceling the visible wavelengths, which can lead to having visible light wavelengths penetrating the band-pass filter.

The combination of the lamp 10, reflector housing 300 and filter assembly 800 is an ultra covert night vision illuminator system that matches almost perfectly with the radiant sensitivity of Generation III night vision systems. The peak performance of the Generation III systems is within the 450 to 950 nm region of the spectrum. The present invention blocks all visible light below 800 nm and some large portion of light in the transition area between 800 to 860 nm, but generates peak transmission efficiency, as illustrated in FIG. 2, in the 860 to 890 nm wavelength range, which maximizes the utility of the illuminator to covert night vision operations.

While the present invention has been illustrated and described herein in terms of a preferred embodiment and several alternatives associated with a handheld HID lighting system for use in visible and covert operations, it is to be understood that the various components of the combination and the combination itself can have a multitude of additional uses and applications. For example, the lamp 10 could be used in lighting systems mounted to a variety of vehicles including military vehicles, vessels, aircraft, and automobiles and the reflector housing 300 and filter lens 902 could be used in many other commercial, scientific, law enforcement, security, and military-type operations. Accordingly, the invention should not be limited to just the particular description and various drawing figures contained in this specification that merely illustrate a preferred embodiment and application of the principles of the invention.

What is claimed is:

1. A high intensity lighting system lens, comprising:
   a borofloat glass lens having an interior surface facing a high intensity lamp and an exterior surface facing atmosphere;
   a first coating on the interior surface for reflecting ultraviolet light and enhancing the transmission of visible and infrared light; and
   a second coating on the exterior surface for reflecting ultraviolet light and enhancing the transmission of visible and infrared light.

2. A high intensity lighting system lens as recited in claim 1, wherein the first coating and the second coating are formed of anti-reflective material.

3. A high intensity lighting system lens as recited in claim 2, further comprising a third coating on the exterior surface for protecting the glass lens and the second coating from abrasion and for facilitating the dispersion of water on the exterior surface.

4. A high intensity lighting system lens as recited in claim 3, wherein the third coating is formed from a hydroscopic material.

5. A high intensity lighting system lens as recited in claim 1, further comprising a third coating on the exterior surface for protecting the glass lens and the second coating from abrasion and for facilitating the dispersion of water and debris on the exterior surface.

6. A high intensity lighting system lens as recited in claim 5, wherein the third coating is formed from a hydrophobic material.

* * * * *